Oct. 26, 1965 J. SCHAF 3,214,670
APPARATUS FOR SIMULTANEOUSLY CHARGING A BATTERY
AND OPERATING A TIMER MOTOR
Filed Oct. 16, 1961 2 Sheets-Sheet 1
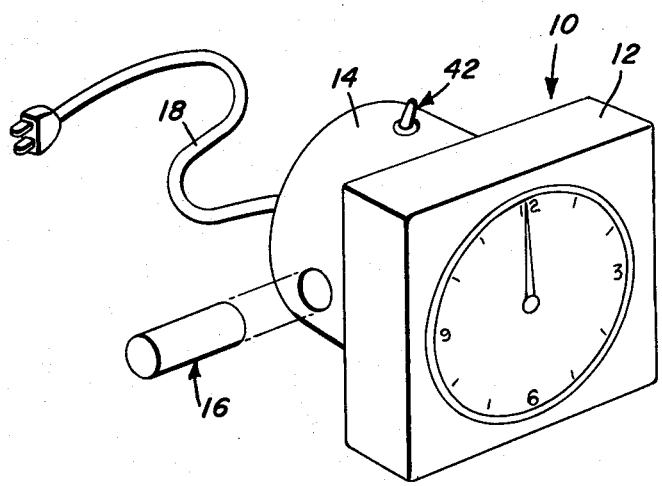
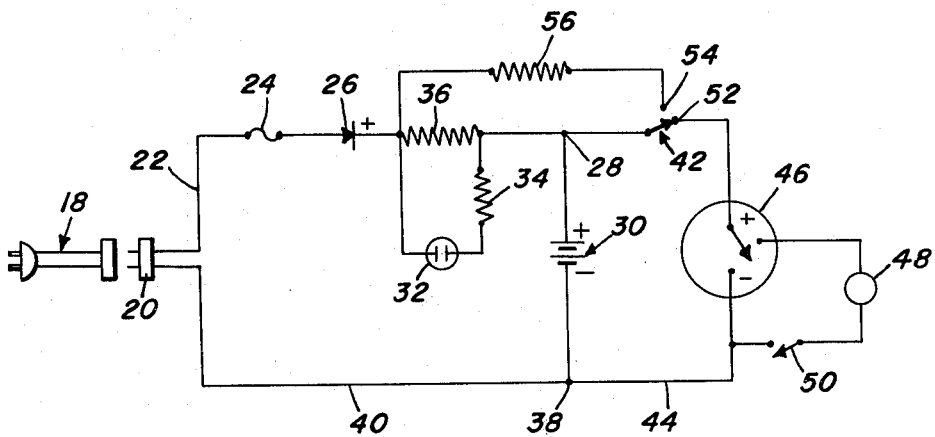
Jack Schaf
INVENTOR.

Oct. 26, 1965        J. SCHAF        3,214,670
APPARATUS FOR SIMULTANEOUSLY CHARGING A BATTERY
AND OPERATING A TIMER MOTOR
Filed Oct. 16, 1961        2 Sheets-Sheet 2

Jack Schaf
INVENTOR.

BY
Attorneys

United States Patent Office

3,214,670
Patented Oct. 26, 1965

1

3,214,670
APPARATUS FOR SIMULTANEOUSLY CHARGING A BATTERY AND OPERATING A TIMER MOTOR
Jack Schaf, Rte. 2, Wausaukee, Wis.
Filed Oct. 16, 1961, Ser. No. 145,072
11 Claims. (Cl. 320—2)

This invention relates to a self-contained power system for electric clocks or timers of the portable type.

The present invention is concerned with a more useful and flexible power supply system for electric clocks and timers than has heretofore been devised. Accordingly, the power supply system of the present invention is applied to electric clocks or timers operating on D.C. current utilizing a power source which is externally available or alternatively operating the timer for prolonged periods of time without any power connections. The external power source constitutes a standby source of power and a selective control is provided for reconditioning the power supply system from the external power source.

It is therefore a primary object of the present invention to provide a power supply system associated with electric clocks or timers utilizing D.C. current for operation thereof, wherein a rechargeable D.C. power supply furnishes the operating current for the clock or timer motor when the system is disconnected from an external source of power constituting a standby power source for operation of the clock or timer motor and also a source of charging current for the rechargeable power supply. A selectively operated control is provided for the purpose of reconditioning the power supply system by disconnecting both the rechargeable power source and the external power source from the timer motor while increasing the charging current from the external source to the rechargeable power source.

Another object of this invention is to provide a power supply system for timer motors having an external standby power supply source which will automatically replace the rechargeable power supply without interruption of the supply of power to the timer motor and to simultaneously charge the rechargeable power supply so as to maintain said rechargeable power supply at full charge as long as the external power supply is available.

A further object of this invention is to provide a power supply system for electric clocks or timers which involves no bulky and costly transformers, relays or moving parts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of one form of power supply system and associated clock or timer device.

FIGURE 2 is a circuit diagram of the power supply system and timer device of FIGURE 1.

Figure 3:
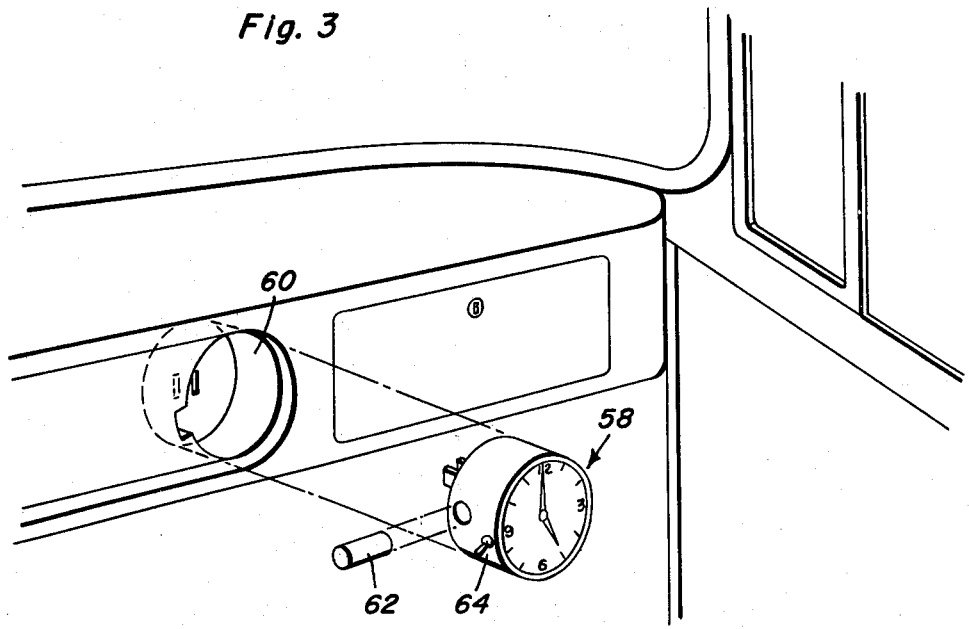
FIGURE 3 is another form of clock or timer and its installational environment.

Referring now to the drawings in detail, attention is initially invited toward FIGURE 1 wherein a unit generally referred to by reference numeral 10 incorporates

2 the principles of the present invention. The unit 10 may be in the form of an electric clock utilized for household purposes wherein there is available an A.C. source of current as a standby source of power although a D.C. source of current would also be acceptable. The device 10 therefore includes a conventional type of electric clock movement housed within the portion 12 of the device 10. Connected to the housing portion 12 and extending rearwardly therefrom, a power supply housing portion 14 may house therewithin the power supply system of the present invention. A rechargeable D.C. voltage source in the form of a battery generally referred to by reference numeral 16 is received within the housing portion 14 and is generally not replaceable but instead rechargeable by connection of the device 10 to an external power source that may be available through the power cable 18.

Referring now to FIGURE 2, it will be observed that the power cable 18 removably connects the power system to either an A.C. or D.C. source of power of anywhere from 85 volts to 140 volts. The cable 18 may be further plugged into the power supply system through a polarizing plug 20 for the purpose of connecting the system to the proper terminals of the external power supply should a D.C. power supply be available. The plug 20 is therefore connected by conductor 22 to a current-limiting fuse 24 in series with a current rectifier device 26. Unidirectional current is therefore furnished to terminal 28 of a rechargeable power source in the form of battery 30 through a charging current indicator in the form of a neon lamp 32 and resistor 34. Connected in parallel with the lamp 32 and resistor 34, is a normal current regulating resistor 36 by means of which the charging current supplied to the positive terminal 28 of the battery 30 may be regulated to the proper value for operating the timer motor. The negative terminal 38 of the battery 30 is therefore connected by conductor 40 to the other terminal of the external power source through the plug device 20.

The battery terminals 28 and 38 are respectively connected through a power reconditioning switch device 42 in normal position and conductor 44 to the terminals of a D.C. motor 46 provided for operation of the clock or timer movement with which the power system of the present invention is associated. The timer motor 46 may be operatively connected to any form of alarm device 48 through an alarm disconnect switch 50. It will therefore be apparent, that the voltage output of the rechargeable source of power 30 is selected commensurate with the operating voltage for the timer motor 46 in order to normally supply thereto, the direct operating current. The presence of the rectifier 26 will enable the charging of the battery 30 to take place where alternating current constitutes the external source. Where the system is however connected to a D.C. external source, the proper connection thereto will be indicated by the neon lamp 32.

It will be apparent from the foregoing, that the timer or clock device 10 may be operated either from the external standby power source during which time the battery source is maintained at full charge or for a prolonged period without any connection to the external power supply. Should the rechargeable battery source 30 become rundown to a sufficient extent as a result of such operation, when the system is reconnected to the external power source, a more rapid charging of the battery 30 may be effected by movement of the reconditioning switch 42 from the contact 52 connecting the positive terminal 28 of the battery to the timer motor 46, to the contact 54 closing a conductive path through a high current regulating resistor 56 in parallel with the normal current regulating, voltage dropping resistor 36 between the output of the rectifier 26 and the positive terminal 28 of the battery. Accordingly, a higher charging current will flow through the battery 30 for return through the conductor 40 which high charging current will more rapidly recarge the battery 30 but at the same time be disconnected from the timer 46 by the switch 42 because of the excessive value of the higher charging current that would be improper for operation of the timer motor.

Referring now to FIGURE 3, the utility of the power supply system of the present invention when applied to vehicle mounted clocks, will become apparent. Accordingly, the clock device 58 may be operatively received within a recess 60 formed in the control panel of an automobile, so that the automobile battery may consitute an external D.C. power source for the power supply system in a manner similar to that described with respect to FIGURES 1 and 2. The clock device 58 therefore also includes a rechargeable power supply 62 and a reconditioning switch device 64. The clock device 58 may therefore also be withdrawn from its recess 60 and utilized as a portable clock when the automobile is not being used.

Figure 4:
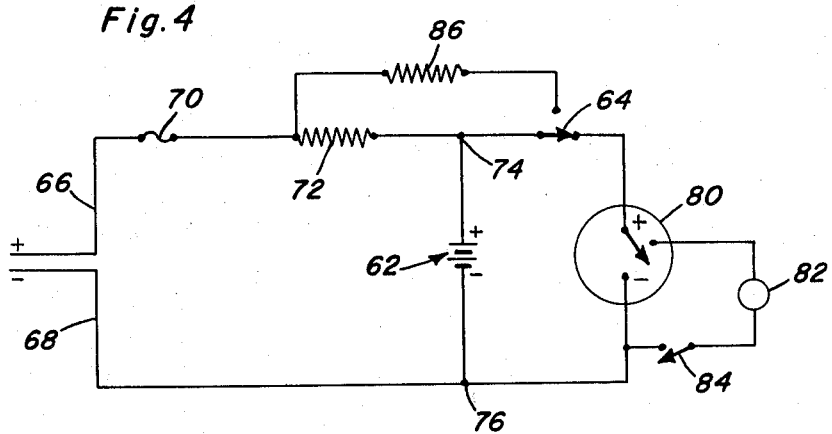
FIGURE 4 is a circuit diagram of the system associated with the device of FIGURE 3.

Referring therefore to FIGURE 4, the circuit diagram for the clock device 58 is illustrated and is similar to that of the circuit diagram of FIGURE 2 except for the omission of the charge indicating lamp 32 and the resistor 34 and the rectifier 26. The power supply system may therefore be connected by conductors 66 and 68 to the 12-volt D.C. power supply of the automobile. The conductor 66 is therefore also connected through a fuse 70 and a normal current-regulating resistor 72 to the positive terminal 74 of the rechargeable D.C. power source 62, the negative terminal 76 of which is connected to the conductor 68. The positive terminal 74 is connected by the normally positioned reconditioning switch 64 to one terminal of the timer motor 80 the other terminal of which is connected to the negative terminal 76 of the rechargeable power supply 62. The timer motor 80 may also have associated therewith an alarm device 82 operatively connected to the circuit through the alarm disconnect switch 84. Connectible in parallel with the normal current-limiting resistor 72 is the high current-regulating resistor 86 rendered operative to increase the charging current to the rechargeable battery 62 when the reconditioning switch 64 disconnects the positive terminal 74 from the timer 80 and electrically connects the resistor 86 in parallel with the resistor 72. Operation of the power system of FIGURE 4 is otherwise the same as that as described with respect to FIGURE 2.

From the foregoing description, the operation and utility of the power supply system for clocks and timers will be apparent. The enhanced utility and flexibility in use of electric clocks and timers effected through the novel power supply system of the present invention will therefore also be appreciated. Furthermore, the absence of any bulky or costly moving parts, transformers or relays in the power supply system will render the arrangement of the present invention more widely available for use because of the unexpected economy of manufacture inherent therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rechargeable self-powered timer unit or the like comprising, timer motor means operative in response to a direct operating current derived from a source of voltage of a predetermined value, rechargeable power means operatively connected to said motor means for continuous supply thereto of said direct operating current when discharging, charge controlling means connected to said rechargeable power means and motor means for simultaneously conducting operating current to the motor means and charging current to the rechargeable power means when the voltage thereof is reduced below said predetermined value, and means for selectively connecting said charge controlling means to an external source of standby power for supplying said current conducted therethrough.

2. The combination of claim 1, including power reconditioning means operatively connected to the charge controlling means and the rechargeable power means for simultaneously disconnecting the rechargeable power means from the motor means and increasing the charging current thereto from the external source of standby power.

3. The combination of claim 2, wherein said charge controlling means comprises a charge current regulating resistor permanently connected to the rechargeable power means for regulating the charging and operating current supplied by the external source of power.

4. The combination of claim 3, including charge indicating means permanently connected to said rechargeable power means in parallel with the charge controlling means.

5. The combination of claim 4, wherein said power reconditioning means comprises a high current regulating resistor permanently connected to said charge controlling means for providing a parallel conductive path to the rechargeable power means and switch means operatively connected to the rechargeable power means and the high current regulating resistor for disconnecting the motor means and rendering said conductive path operative to increase the charging current from the external source of power.

6. The combination of claim 1, wherein said charge controlling means comprises a charge current regulating resistor permanently connected to the rechargeable power means for regulating the charging and operating current supplied by the external source of power.

7. The combination of claim 6, including charge indicating means permanently connected to said rechargeable power means in parallel with the charge controlling means.

8. The combination of claim 1, including power reconditioning means comprising a high current regulating resistor permanently connected to said charge controlling means for providing a parallel conductive path to the rechargeable power means and switch means operatively connected to the rechargeable power means and the high current regulating resistor for disconnecting the motor means and rendering said conductive path operative to increase the charging current from the external source of power.

9. The combination of claim 1, wherein said charge controlling means includes a rectifier connected in series between the rechargeable power means and external source of power for rectification of any alternating current from the external source of power.

10. The combination of claim 9 including charge indicating means connected in series with said rectifier for indicating proper polarity connection of said external source of power when supplying direct current.

11. A power system for an electrical load operated by a predetermined direct operating current comprising, a rechargeable source of potential adapted to supply said direct operating current to the load when fully charged, an external source of standby power, voltage reducing means connected to said load and said rechargeable source of potential, means for selectively connecting said external source to said voltage reducing means to regulate charging of said rechargeable source of potential to a relatively low rate by charging current substantially equal to said operating current and simultaneously operating said load without interruption in power supplied thereto, and selectively controlled means operatively connected to said rechargeable source of potential for simultaneously disconnecting the load therefrom and increasing the charging current from the external source above the operating current for charging the rechargeable source at a higher rate.

References Cited by the Examiner

UNITED STATES PATENTS 3,062,998 11/62 Medlar _____ 320—48

FOREIGN PATENTS 211,744 10/60 Austria.
1,051,163 2/59 Germany.
1,052,265 3/59 Germany.

LLOYD McCOLLUM, *Primary Examiner.*